(12) United States Patent
Usui et al.

(10) Patent No.: US 11,830,255 B2
(45) Date of Patent: Nov. 28, 2023

(54) METHOD AND SYSTEM FOR RECOGNIZING SIGN

(71) Applicant: DENSO CORPORATION, Kariya (JP)

(72) Inventors: Yoshimasa Usui, Kariya (JP); Tomoo Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 289 days.

(21) Appl. No.: 17/186,948

(22) Filed: Feb. 26, 2021

(65) Prior Publication Data

US 2021/0182581 A1  Jun. 17, 2021

Related U.S. Application Data

(63) Continuation of application No. PCT/JP2019/033315, filed on Aug. 26, 2019.

(30) Foreign Application Priority Data

Aug. 31, 2018 (JP) .................................. 2018-163075
Jul. 25, 2019 (JP) .................................. 2019-136947

(51) Int. Cl.
*G06V 20/58* (2022.01)
*B60R 1/00* (2022.01)
*G06V 20/62* (2022.01)

(52) U.S. Cl.
CPC .............. *G06V 20/582* (2022.01); *B60R 1/00* (2013.01); *G06V 20/63* (2022.01); *B60R 2300/80* (2013.01)

(58) Field of Classification Search
CPC ..... B60W 40/06; G06V 20/56; G06V 20/588; G06V 20/582; G06V 40/172; G06V 20/63; G06V 20/46; G01C 21/32

USPC ......................................................... 348/148
See application file for complete search history.

(56) References Cited

U.S. PATENT DOCUMENTS

| | | | |
|---|---|---|---|
| 2008/0187221 A1* | 8/2008 | Konno | G06V 30/1448 382/175 |
| 2010/0172580 A1* | 7/2010 | Takenouchi | G08G 1/017 382/165 |
| 2011/0307169 A1 | 12/2011 | Shimizu et al. | |
| 2012/0128210 A1 | 5/2012 | Zobel | |
| 2016/0267332 A1* | 9/2016 | Tsushima | G06V 20/582 |
| 2017/0046580 A1* | 2/2017 | Lu | G06T 7/74 |
| 2017/0166122 A1* | 6/2017 | Ando | G06V 20/582 |
| 2017/0308989 A1* | 10/2017 | Lee | H04N 23/60 |

FOREIGN PATENT DOCUMENTS

| | | |
|---|---|---|
| JP | 2009-009368 A | 1/2009 |
| JP | 2010-266383 A | 11/2010 |
| JP | 2018-510373 A | 4/2018 |
| WO | 2018/142533 A1 | 9/2018 |

* cited by examiner

*Primary Examiner* — Nathnael Aynalem
(74) *Attorney, Agent, or Firm* — MASCHOFF BRENNAN

(57) ABSTRACT

A sign recognition system according to an exemplary aspect of the present disclosure is configured to, when image data of a sign is captured by a vehicular camera, recognize one or more characters, which are included in the sign and belong to at least one specified character type, from the image data, thus extracting, from the image data, the recognized one or more characters. The sign recognition system is also configured to store a sign dataset in a sign database; the sign dataset includes (i) an installation-position information item indicative of the installation position of the sign, and (ii) an attribute information item about the sign.

12 Claims, 13 Drawing Sheets

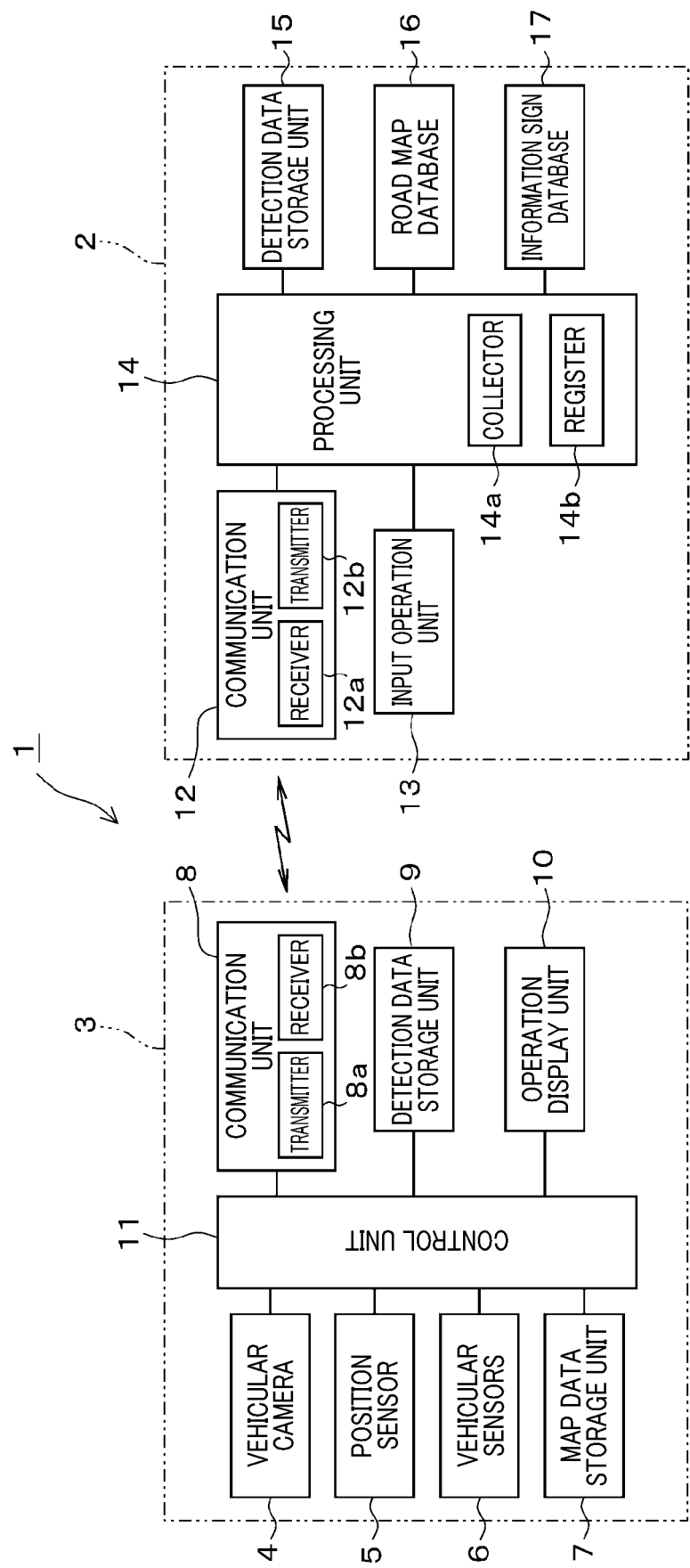

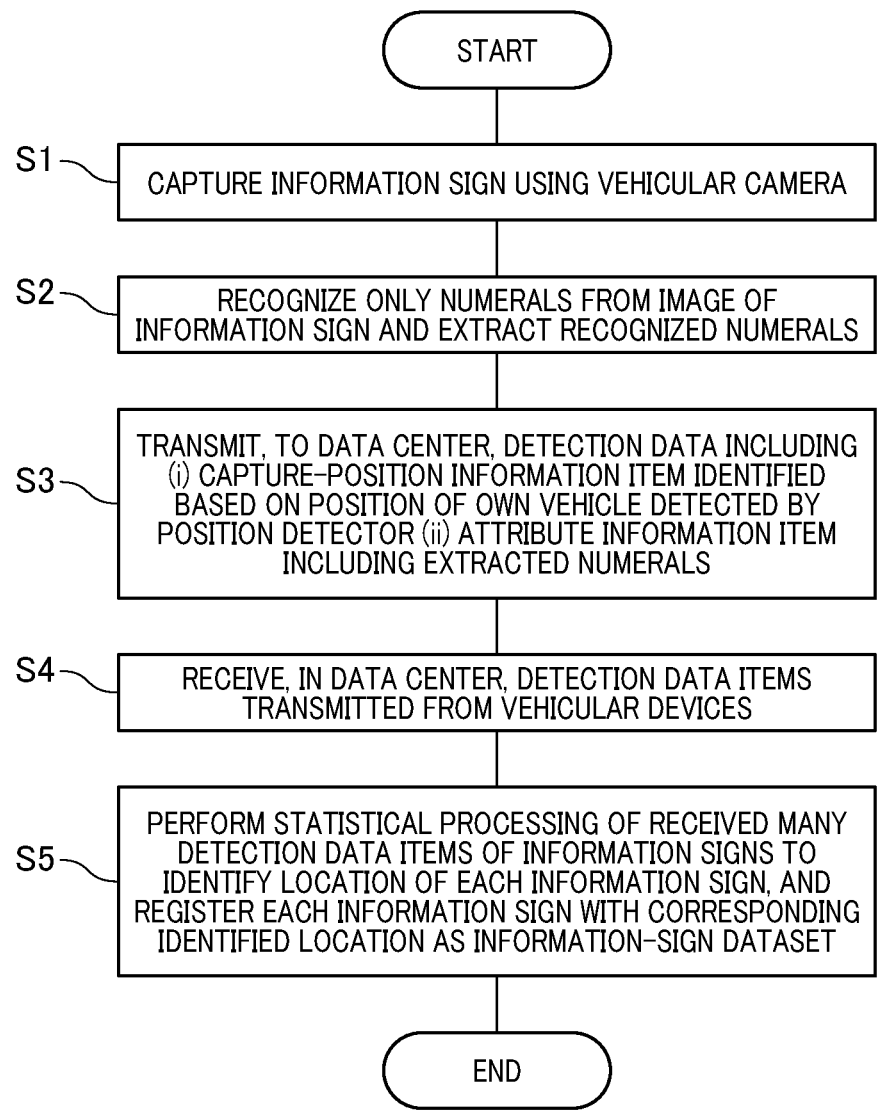

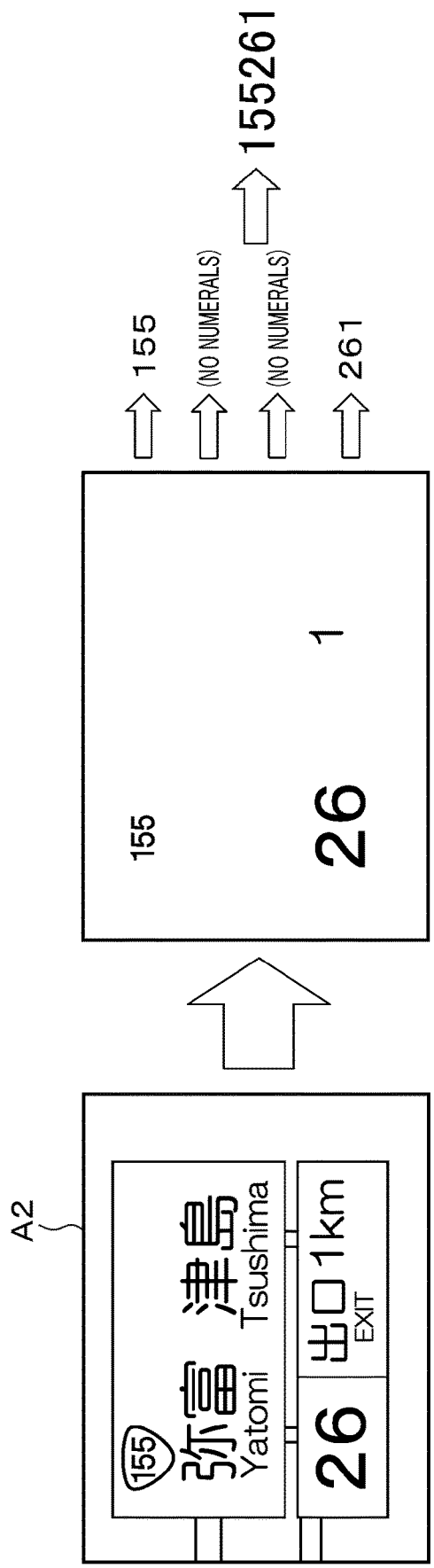

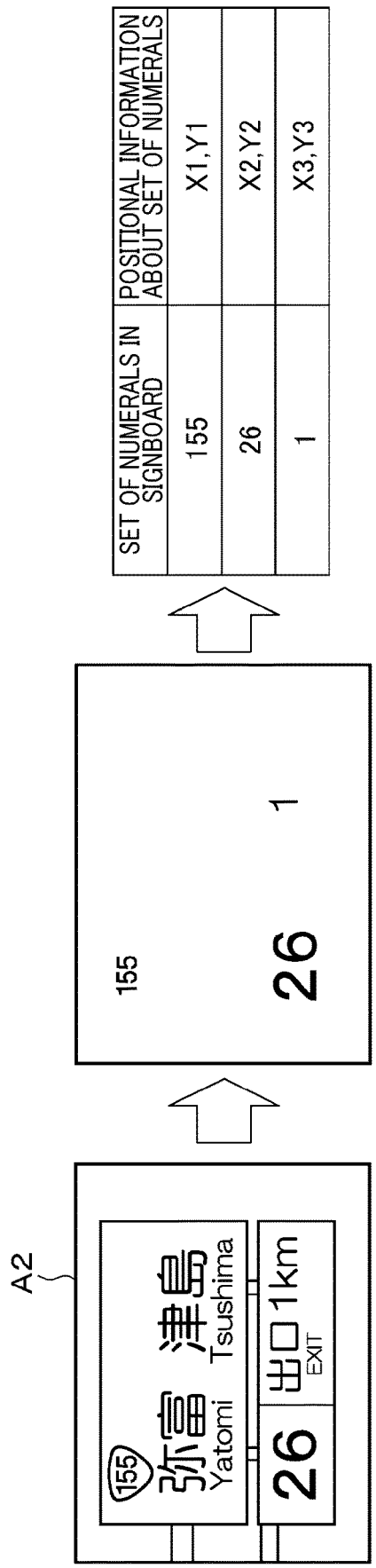

METHOD AND SYSTEM FOR RECOGNIZING SIGN

CROSS-REFERENCE TO RELATED APPLICATION

This application is a bypass continuation application of currently pending international application No. PCT/JP2019/33315 filed on Aug. 26, 2019 designating the United States of America, the entire disclosure of which is incorporated herein by reference.

This application is based on and claims the benefit of priority from Japanese Patent Application No. 2018-163075 filed on Aug. 31, 2018 and Japanese Patent Application No. 2019-136947 filed on Jul. 25, 2019, the entire disclosure of each of which is incorporated herein by reference.

TECHNICAL FIELD

The present disclosure relates to methods and systems for recognizing signs.

BACKGROUND

Vehicles, such as automobiles, have each been recently designed to capture images of a forward view thereof using a vehicular camera installed in the corresponding vehicle, and to use the captured images to for example assist driving of the corresponding vehicle.

SUMMARY

A sign recognition system according to an exemplary aspect of the present disclosure is configured to, when image data of a sign is captured by a vehicular camera, recognize one or more characters, which are included in the sign and belong to at least one specified character type, from the image data, thus extracting, from the image data, the recognized one or more characters. The sign recognition system is also configured to store a sign dataset in a sign database; the sign dataset includes (i) an installation-position information item indicative of the installation position of the sign, and (ii) an attribute information item about the sign. The attribute information item about the sign includes a string of the one or more characters extracted by the extraction unit.

BRIEF DESCRIPTION OF THE DRAWINGS

The object, other objects, features, and benefits regarding the present disclosure will become more apparent from the following detailed description with reference to the accompanying drawings in which:

FIG. 1 is a block diagram schematically illustrating an overall configuration of a system according to the first embodiment;

FIG. 2 is a flowchart schematically illustrating a procedure of an information-sign dataset registering routine carried out by a control unit and a processing unit according to the first embodiment;

FIG. 4 is a diagram schematically illustrating a process of extracting only numerals from captured image data according to the first embodiment;

FIG. 13 is a diagram schematically illustrating a process of extracting, from captured image data, numerals with positional information according to the sixth embodiment.

DETAILED DESCRIPTION OF EMBODIMENTS

Figure 3A:
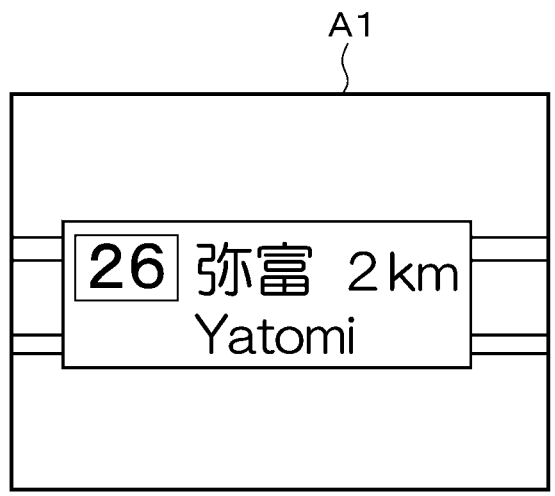
FIG. 3A is a view illustrating a specific first example of an information sign according to the first embodiment.

Methods and systems for recognizing signs, which will also be referred to as sign recognition methods and systems, are each capable of capturing an image of a sign, such an information sign for road guidance or a signboard using a vehicular camera installed in a vehicle. Then, these sign recognition methods and systems are each capable of recognizing the sign in accordance with data of the captured image, which will also be referred to as a captured image data item.

For example, Japanese Patent Application Publication No. 2010-266383 discloses the following technology. The disclosed technology detects, from a forward image captured by a camera installed in a vehicle, an information sign located in a forward portion of a road. Then, the disclosed technology analyzes data of a portion of the captured forward image; the portion corresponds to the information sign.

In accordance with a result of the analysis, the disclosed technology recognizes the string of characters written in the information sign, indicative of, for example, one or more destination names, one or more directions, one or more distances, or an intersection to thereby display simplified presentation of the recognized string of characters on a monitor installed in the camera.

The implementation of autonomous driving of vehicles has been gained momentum recently. This has resulted in many requests for creating high-accuracy road map data. From this viewpoint, a road map creating system is known, which (i) captures, for example, forward images from a vehicle using a camera installed in the vehicle while the vehicle is traveling, and (ii) generates, based on captured image data items, i.e. probe data items, a road map In addition, a vehicle position detection system is known, which checks images captured by a camera installed in a vehicle against road map data to thereby detect a position of the vehicle.

Information signs over roads have different pieces of information displayed thereon. Information signs are typically installed on or over each principal road at suitable intervals. For these characteristics of information signs, superimposing data of each of the information signs on road map data as a corresponding landmark is expected as an effective measure.

Unfortunately, analyzing the whole of each of captured image data items for identifying, i.e. recognizing, many information signs included in the captured image data items may result in an increase in the amount of data that should be analyzed, resulting in an increase in time required for (i) communications of the captured image data items and/or (ii) analyzing of the captured image data items.

For this reason, more simple identification and/or recognition of one or more information signs may therefore be needed.

From this viewpoint, the present disclosure seeks to provide methods and systems for recognizing signs, each of which is capable of simply performing a task of identifying a sign captured by a vehicular camera as one of sign data items in a database. Note that signs according to the present disclosure include, for example, information signs for road guidance and/or signboards A sign recognition system according to a first aspect of the present disclosure for recognizing a sign in accordance with image data of the sign captured by a vehicular camera installed in a vehicle includes an extraction unit. The extraction unit is configured to recognize, in the image data, one or more characters that are included in the sign and belong to at least one specified character type, and extract, from the image data, the recognized one or more characters. The sign recognition system includes a sign database configured to store a sign dataset. The sign dataset includes (i) an installation-position information item indicative of an installation position of the sign, and an attribute information item about the sign. The attribute information item about the sign includes a string of the one or more characters extracted by the extraction unit.

When the image data of the sign is captured by the vehicular camera, the extraction unit recognizes one or more characters, which are included in the sign and belong to at least one specified character type, from the image data, thus extracting, from the image data, the recognized one or more characters.

In the sign database, the sign dataset is stored; the sign dataset includes (i) the installation-position information item indicative of the installation position of the sign, and (ii) the attribute information item about the sign.

The first aspect uses, as the attribute information item about the sign, information about the string of the one or more characters extracted by the extraction unit for identification of the sign. This therefore drastically lowers the amount of data processed for identification of the sign, resulting in both shorter time of communications of the attribute information item and shorter time required to perform processing, such as image processing, of the attribute information item. The above configuration also limits recognition target characters of the sign to characters belonging to the at least one specified character type. This makes it possible to reduce the size of a dictionary used for recognition of the sign, thus enabling the recognition of the sign to be carried out faster. This results in more simple execution of a task of identifying that the sign captured by the vehicular camera matches which of signs stored in the sign database.

The following describes embodiments with reference to the accompanying drawings. Components of each embodiment, which correspond to those of one or more already-described embodiments, are denoted by the same reference characters or numerals, and therefore new or duplicated descriptions of the components of each embodiment may be omitted.

In the following descriptions, information signs are signs installed at predetermined respective locations linked to roads by road managers, which serve as at least one of route guidance, destination guidance, and adjunct facility guidance. Each information sign is installed for a corresponding road in accordance with predetermined rules, so that the corresponding information sign has a predetermined shape, at least one predetermined color, and a predetermined size of each character used therein.

Additionally, in the following descriptions, signboards are produced for mainly commercial purposes, such as advertising purposes, and installed, for example, at shopfronts and/or along roads in order to show the signboards to people passing through the roads. For example, each signboard is comprised of a board on which the name of at least one commercial facility, the direction to at least one commercial facility, and/or the location of at least one commercial facility, which includes a distance thereto. Signs represent a broader concept of such information signs and signboards.

First Embodiment

The following describes the first embodiment with reference to FIGS. 1 to 5.

FIG. 1 schematically illustrates an overall configuration of an information sign recognition system 1 serving as a sign recognition system according to the first embodiment. The information sign recognition system 1 is comprised of a data center 2 and vehicular devices 3. The data center 2 collects data items and analyzes the collected data items to accordingly generate an information sign database as a high-accuracy sign database.

The vehicular devices 3 are installed in respective vehicles including passenger vehicles and/or trucks, which travel on roads. FIG. 1 schematically illustrates one vehicular device 3 for simple illustration.

The vehicular device 3 installed in each vehicle includes a vehicular camera 4, a position detector 5, various vehicular sensors 6, a map data storage unit 7, a communication unit 8, a detection data storage unit 9, an operation display unit 10, and a control unit 11.

The vehicular camera 4 is mounted to, for example, the front end of the corresponding vehicle, and configured to capture at least a forward road situation of the corresponding vehicle in its traveling direction.

The position detector 5 includes a known configuration that is provided with a GPS receiver for receiving position data, and detects the current position of the corresponding vehicle in accordance with the position data received by the GPS receiver.

The various vehicular sensors 6 include one or more sensors for measuring speed information indicative of the speed of the corresponding vehicle, and one or more sensors for measuring direction information indicative of the traveling direction, i.e. the direction of the body, of the corresponding vehicle.

The map data storage unit 7 stores road map information indicative of a road map across the corresponding nation. The communication unit 8 communicates with the data center 2 using a mobile communication network and/or road-to-vehicle communications. The communication unit 8 serves as both a transmitter 8a as a transmitter unit, and a receiver 8b as a receiver unit.

As described later, in the detection data storage unit 9, detection data items for respective information signs are stored; each of the detection data items includes an estimated capture-position information item and an obtained attribute information item about a corresponding one of the information signs.

The operation display unit 10 includes, for example, unillustrated switches, a touch screen, and a display. The operation display unit 10 enables a user, such as a driver, of the vehicular device 3 to operate the operation display unit 10, and displays information required for a user, such as navigation frame images.

The control unit 11 is configured to include a computer, and operative to control overall operations of the vehicular device 3.

Specifically, the control unit 11 instructs the vehicular camera 4 to capture a forward road situation of the corresponding vehicle while the corresponding vehicle is traveling. Then, the control unit 11 determines whether there is at least one information sign as at least one sign in captured image data.

In response to determination that there is at least one information sign as at least one sign in the captured image data, the control unit 11 recognizes, from captured image data of the at least one information sign, each of selected characters included in a character set written in the at least one information sign using a known OCR technology to thereby extract the recognized characters from the captured image data; the selected characters included in the character string belong to at least one specified type of characters, i.e. at least one specified character type.

After extraction of the recognized characters of the at least one information sign, the control unit 11 recognizes the string of the extracted characters of the at least one information sign as an attribute information item for identifying the at least one information sign. That is, the control unit 11 serves as an extraction unit. The detailed information about such an attribute information item will be described later.

In addition to the extraction, the control unit 11 estimates the position of the at least one information sign where the at least one information sign is placed in accordance with, for example, (i) The position of the corresponding vehicle at the timing of capturing the at least one information sign detected by the position detector 5
(ii) The traveling speed of the corresponding vehicle at the timing of capturing the at least one information sign
(iii) The traveling direction of the corresponding vehicle at the timing of capturing the at least one information sign Then, the control unit 11 recognizes the estimated position as a capture-position information item, and stores a detection data item in the detection date storage unit 9 while an additional data item, such as captured date and time, is attached to the corresponding detection data item; the detection data item is comprised of (i) the attribute information item about the at least one information sign, and (ii) the capture-position information item about the at least one information sign.

The communication unit 8 transmits the detection data items stored in the detection data storage unit 9 to the data center 2.

The data center 2 includes a communication unit 12, an input operation unit 13, a processing unit 14, a detection data storage unit 15, a road map database 16, and an information sign database 17 serving as a sign database. The communication unit 12 communicates with the communication unit 8 of each vehicle to thereby receive the detection data items from the corresponding vehicle. The communication unit 12 serves as both a receiver 12a as a receiver unit and a transmitter 12b as a transmitter unit. The input operation unit 13 enables an operator to perform necessary input operations.

The processing unit 14 is mainly comprised of a computer, and is operative to control overall operations of the data center 2. In addition to the overall control, the processing unit 14 performs, for example, 1. A task of generating road map data
2. A task of generating information-sign datasets (see FIG. 5) as sign datasets
3. A task of updating at least one of the information-sign datasets These tasks will be described later.

In the detection date storage unit 15, the detection-date items transmitted from each vehicle are temporarily stored. This enables an enormous number of detection data items to be collected from many vehicles traveling in, for example, all over Japan.

In the road map database 16, high-accuracy road map data generated by the processing unit 14 is stored. In the information sign database 17, the information-sign datasets are stored as the sign datasets; each information-sign dataset can be used as landmark information.

Figure 5:
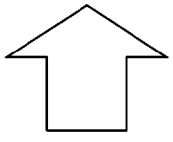
FIG. 5 is a diagram schematically illustrating how to update and register an installation position item about an information-sign dataset according to the first embodiment.

As partially illustrated in FIG. 5, the information-sign dataset about a selected sign includes (1) An installation position information item, i.e. a coordinate information item including corresponding coordinates of longitude and latitude, about the selected sign
(2) An attribute information item about the selected sign The signs include information signs installed for each of main roads throughout Japan, and signboards installed along roads In the road map database 16, the information sign database 17 can be incorporated. In the road map data, the sign data items can be included as landmarks, and the attribute information items can be included in the respective sign data items.

As described in the later explanation of how the control unit 11 works using a flowchart, the control unit 11 of each vehicular device 3 according to the first embodiment performs an extraction step of 1. Recognizing, from at least one information sign, which is an example of signs, of the first embodiment, in image data captured by the vehicular camera 3, at least one numeral included in the range of 0 to 9 as the at least one specified character type
2. Extracting the recognized at least one numeral from the captured image data The extracted at least one numeral, i.e. at least one numeric character, of at least one information sign is recognized as an attribute information item about the at least one information sign.

As a specific process in the extraction step, the control unit 11 performs a search of the at least one information sign in the captured image data for numerals from left to right, and repeats the search from top to bottom of the at least one information sign to thereby extract numerals from the at least one information sign. Then, the control unit 11 arranges the extracted numerals in the order of extraction, thus obtaining the string of the arranged numerals, i.e. numeric characters, as an attribute information item.

Then, the processing unit 14 of the data center 2 receives the detection data items transmitted from the vehicular device 3 of each vehicle to thereby collect them, and stores the collected detection data items in the detection data storage unit 15. In addition to the data collection, the processing unit 14 of the data center 2 performs a sign data storing step of 1. Generating, based on the collected detection data items, information-sign datasets
2. Registering the generated information-sign datasets in the information-sign database 17 and/or
3. Updating the information-sign database 17 based on the generated information-sign datasets Thus, the processing unit 14 serves as both a collector 14a, which is a collection unit, and a register 14b, which is a register unit.

As a specific process in the sign data storing step, for register of a generated information-sign dataset in the information-sign database 17. the processing unit 14 is configured to 1. Select, from the detection data storage unit 15, some detection data items that have the attribute information item identical to the attribute information item about the generated information-sign dataset
2. Perform statistical processing of the capture-position information items of the respective selected detection data items to thereby determine the installation position information item about the generated information-sign dataset, thus registering, in the information-sign database 17, the generated information-sign dataset with the determined installation position information item FIGS. 3A to 3E illustrate captured images that respectively include information signs A1 to A5 installed for, for example, an expressway; the information signs A1 to A5 are an example of information signs as signs. Each of the information signs A1 to A5 guides the name of the corresponding direction of the expressway and/or the name of the corresponding upcoming interchange exit of the expressway. Each of the information signs A1 to A5 is comprised of a rectangular board with a green-colored major surface on which white characters are written.

Specifically, the information sign A1 illustrated in FIG. 3A shows the upcoming interchange exit "弥富 (Yatomi)" at the interchange number "26", and the distance of 2 km thereto.

Figure 3B:
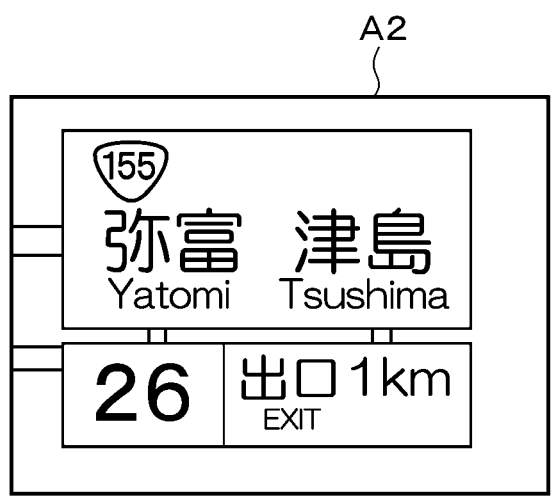
FIG. 3B is a view illustrating a specific second example of an information sign according to the first embodiment.

The information sign A2 illustrated in FIG. 3B shows the upcoming interchange exit to the direction of "弥富 (Yatomi)" and "津島 (Tsushima)", the distance of 1 km thereto, and National highway 1 to which the exit accesses.

Figure 3C:
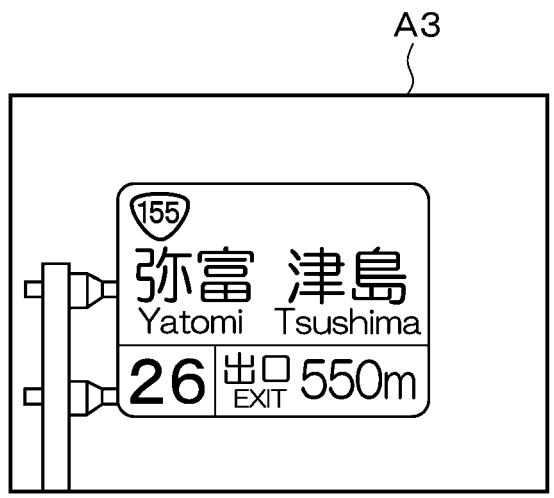
FIG. 3C is a view illustrating a specific third example of an information sign according to the first embodiment.

The information sign A3 illustrated in FIG. 3C shows the upcoming interchange exit to the direction of "弥富 (Yatomi)" and "津島 (Tsushima)", and the distance of 550 m thereto.

Figure 3D:
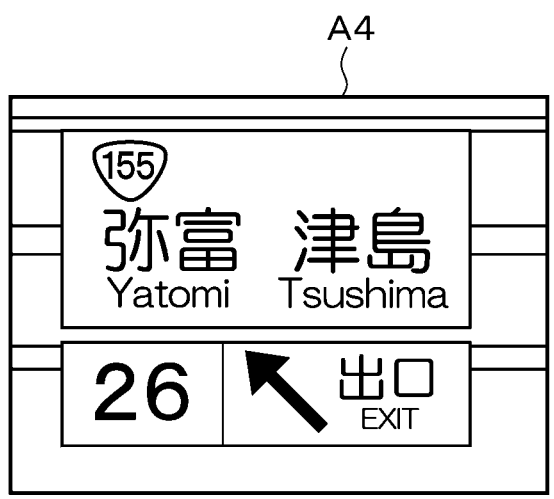
FIG. 3D is a view illustrating a specific fourth example of an information sign according to the first embodiment.

The information sign A4 illustrated in FIG. 3D shows the upcoming interchange exit to the direction of "弥富 (Yatomi)" and "津島 (Tsushima)".

Figure 3E:
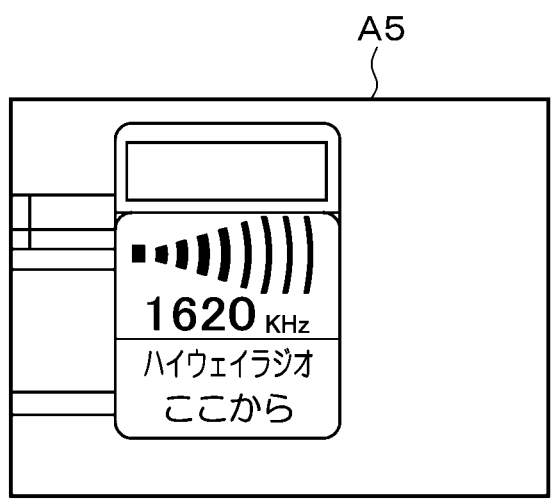
FIG. 3E is a view illustrating a specific fifth example of an information sign according to the first embodiment.

The information sign A5 illustrated in FIG. 3E shows that Highway radio at 1620 kHz is available from the point of the expressway posted with the information sign A5.

Next, the following describes how the information sign recognition system 1 configured set forth above operates with reference to FIGS. 2 to 5 in addition to FIG. 1.

FIG. 2 illustrates a flowchart representing a procedure of an information-sign dataset registering routine carried out by the control unit 11 of each vehicular unit 3 and the processing unit 14 of the data center 2; the procedure of the information-sign dataset registration routine corresponds to a sign recognition method of the first embodiment.

In FIG. 2, operations in respective steps S1 to S3 are carried out by the control unit 11 of each vehicular device 3 while the corresponding vehicle is traveling.

Specifically, the control unit 11 causes the vehicular camera 4 to capture an image of a forward region of the corresponding traveling vehicle in its traveling direction, and continuously monitor whether there is an information sign included in an image captured by the vehicular camera 4 in step S1.

In response to determination that there is an information sign included in an image, i.e. a frame image, currently captured by the vehicular camera 4 in step S1, the control unit 11 performs, as the extraction step, a step of 1. Recognizing, from the information sign included in the frame image as captured image data, numerals as the at least one specified character type
2. Extracting the recognized numerals from the frame image in step S2

As the specific process described above, the control unit 11 performs a search of the information sign in the captured image data for numerals from left to right, and repeats the search from top to bottom of the information sign in step S2. Then, the control unit 11 arranges numerals extracted from the information sign in the order of extraction, thus obtaining the string of the arranged numerals, i.e. numeric characters, as an attribute information item in step S2.

FIG. 4 schematically illustrates the specific process of extracting only numerals from the information sign A2 illustrated in FIG. 3B, which is an example of an information sign, included in the captured image data.

Specifically, the control unit 11 traces a top first block of the captured image data from left to right to thereby recognize numerals "155", thus extracting, from the captured image data, the numerals "155". Next, although the control unit 11 traces each of second and third blocks of the captured image data from left to right, the control unit 11 does not recognize numerals.

The control unit 11 traces a bottom block of the captured image data from left to right to thereby recognize numerals "26" first, and thereafter recognize a numeral "1". Thus, the control unit 11 extracts, from the captured image data, the numerals "261".

This results in the string of numerals "155261" being obtained as an attribute data item of the information sign A2.

Similarly, it is possible to obtain, from the information sign A1 illustrated in FIG. 3A, the string of numerals "262" as an attribute data item of the information sign A1, and obtain, from the information sign A3 illustrated in FIG. 3C, the string of numerals "155265502 as an attribute data item of the information sign A3. Additionally, it is possible to obtain, from the information sign A4 illustrated in FIG. 3D, the string of numerals "15526" as an attribute data item of the information sign A4, and obtain, from the information sign A5 illustrated in FIG. 3E, the string of numerals "1620" as an attribute data item of the information sign A5.

Returning to FIG. 2, the control unit 11 identifies the position of the information sign captured by the vehicular camera 4, that is, a capture-position information item about the captured information sign in step S3. Then, the control unit 11 instructs the communication unit 8 to transmit, to the data center 2, the set of the capture-position information item and the attribute information item about the information sign as a detection data item in step S3.

Specifically, in step S3, the control unit 11 obtains, based on the position and/or size of the information sign in the captured image data, a distance to the information sign, and estimates the capture-position information item about the information sign in accordance with (i) The position of the corresponding vehicle at the timing of capturing the information sign detected by the position detector 5

(ii) The obtained distance to the information sign

Operations in respective steps S4 and S5 are carried out by the processing unit 14 of the data center 2.

Specifically, the processing unit 14 receives, via the communication unit 12 of the data center 2, the detection data items transmitted from each vehicular device 3, and the processing unit 14 writes the received detection data items in the detection data storage unit 15 in step S4.

Next, the processing unit 14 of the data center 2 performs statistical processing of a large number of the received detection data items to thereby identify a location of each of information signs in step S5.

Then, the processing unit 14 generates information-sign datasets, each of which includes (i) an information item about position coordinates of the installation position of a corresponding one of the information signs, and (ii) the attribute information item about the corresponding one of the information signs in step S5. Thereafter, the processing unit 14 registers the information-sign datasets in the information sign database 17 in step S5. The operation in step S5 serves as a sign dataset storage step. The registering operation includes a new registration operation and an updating registration operation.

For registering of a target information-sign dataset, the processing unit 14 selects, from the detection data storage unit 15, some detection data items that have the attribute information item, i.e. the string of numerals, identical to the attribute information item about the target information-sign dataset to be registered.

Then, the processing unit 14 performs statistical processing of the position coordinates, which are the capture-position information items, of the respective selected detection data items to thereby determine statistically derived position coordinates as an installation position information item about the target information-sign dataset, thus registering, in the information-sign database 17, the target information-sign dataset with the determined installation position information item.

For example, the processing unit 14 performs, as the statical processing, (1) Elimination of at least one outlier detection data item having an outlier capture-position information item from the selected detection data items (2) Obtain an average, a median, or a mode of the selected detection data items, from which the at least one outlier detection data item has been eliminated FIG. 5 illustrates an example where the updating registration operation is carried out. Specifically, the installation position coordinates (X1, Y1) of an information sign having identification No. 1 and the attribute information item "155261" stored in the information-sign database 17 is updated to new installation position coordinates (X2, Y2).

The information sign recognition system 1 and an information sign recognition method according to the first embodiment achieve the following benefits.

Specifically, the vehicular camera 4 of each vehicular device 3 captures an information sign while the corresponding vehicle is traveling. The control unit 11 of each vehicular device 3 performs the extraction step of 1. Recognizing, from captured image data of the information sign, at least one character that is included in the information sign and belongs to the at least one specified character type 2. Extracting the recognized at least one character from the captured image data The communication unit 8 transmits, to the data center 2, the detection data item including (i) the attribute information item about the information sign, and (ii) the capture-position information item about the information sign.

At that time, the processing unit 14 of the data center 2 receives the detection data items transmitted from the vehicular devices 3 of the vehicles to accordingly collect the detection data items. Then, the processing unit 14 performs the sign strong step of 1. Generating, based on the collected detection data items, information-sign datasets, each of which includes an installation position information item and an attribute information item about the corresponding one of the information signs 2. Registering the generated information-sign datasets in the information-sign database 17

Because the attribute information about each information sign for identifying the corresponding information sign is comprised of the string of characters, which belong to the at least one specified character type, extracted from the corresponding information sign, this configuration of the information sign recognition system 1 drastically lowers the amount of data transmitted from each vehicular device 3 to the data center 2. This therefore results in both shorter time of communications between the data center 2 and each vehicular device 3 and shorter time required to manipulate the detection data items, making it possible to (i) Reduce the amount of the information-sign datasets stored in the road map database 16 to accordingly reduce the storage capacity of the information-sign datasets (ii) Make easier manipulation of the information-sign datasets As described above, each of the information sign recognition system 1 and the information sign recognition method according to the first embodiment causes the vehicular camera 4 of each vehicular device 3 to capture an information sign for road guidance as a sign, and recognizes, based on captured image data of the information sign, the information sign. That is, each of the information sign recognition system 1 and the information sign recognition method makes it possible to easily identify that the information sign captured by the vehicular camera 5 matches which of information signs stored in the information-sign database 17.

The processing unit 14 of the data center 2 according to the first embodiment selects, from the received detection data items, some detection data items that have the attribute information item identical to the attribute information item about a target information-sign dataset. Then, the processing unit 14 performs statistical processing of the capture-position information items of the respective selected detection data items to thereby determine the installation position information item about the target information-sign dataset. This makes it possible to generate the information-sign datasets each having more accurate installation position information item, thus establishing the information sign database 17 with higher accuracy.

The first embodiment utilizes, as the at least one specified character type constituting an attribute information item, one or more numerals. This enables recognition of the type of characters included in an information sign to be carried out with a sufficient degree of accuracy and a shorter time. In addition, because the first embodiment extracts and recognizes only ten numerical characters of 0 to 9, the first embodiment can perform extremely simple recognition of characters included in an information sign while making easier data processing of the characters.

In particular, the first embodiment utilizes a rule that
1. Performs a search of captured image data of an information sign for numerals from left to right of the information sign
2. Repeats the search from top to bottom of the information sign
3. Arrange numerals extracted from the information sign in the order of extraction, thus obtaining the string of the arranged numerals, i.e. numeric characters, as an attribute information item This makes it easier to extract the attribute information item from an information sign.

Note that the vehicular camera 4 is configured to capture an image data frame for example every 100 msec, which is not described in the first embodiment, and therefore it is necessary to determine, from the image data frames, one image data frame captured at which point of time to be used for the above recognition processing.

In terms of higher recognition accuracy, it is preferable to use a captured image data frame in which a sign maximally appears just before disappearance thereof from the captured image frame. However, for performing a localization task, which will be described later, from far, it is beneficial to recognize an information sign using an image data frame captured relatively earlier. For example, it is possible to perform processing of an image-data frame captured at a timing when the vehicle is located 50 meters away from a sign. Note that the localization task is to analyze captured image data to thereby localize the position coordinates of an own vehicle in accordance with a relative position of a recognized sign relative to the own vehicle and position coordinates of the sign registered in the map data.

Second Embodiment

Figure 6:
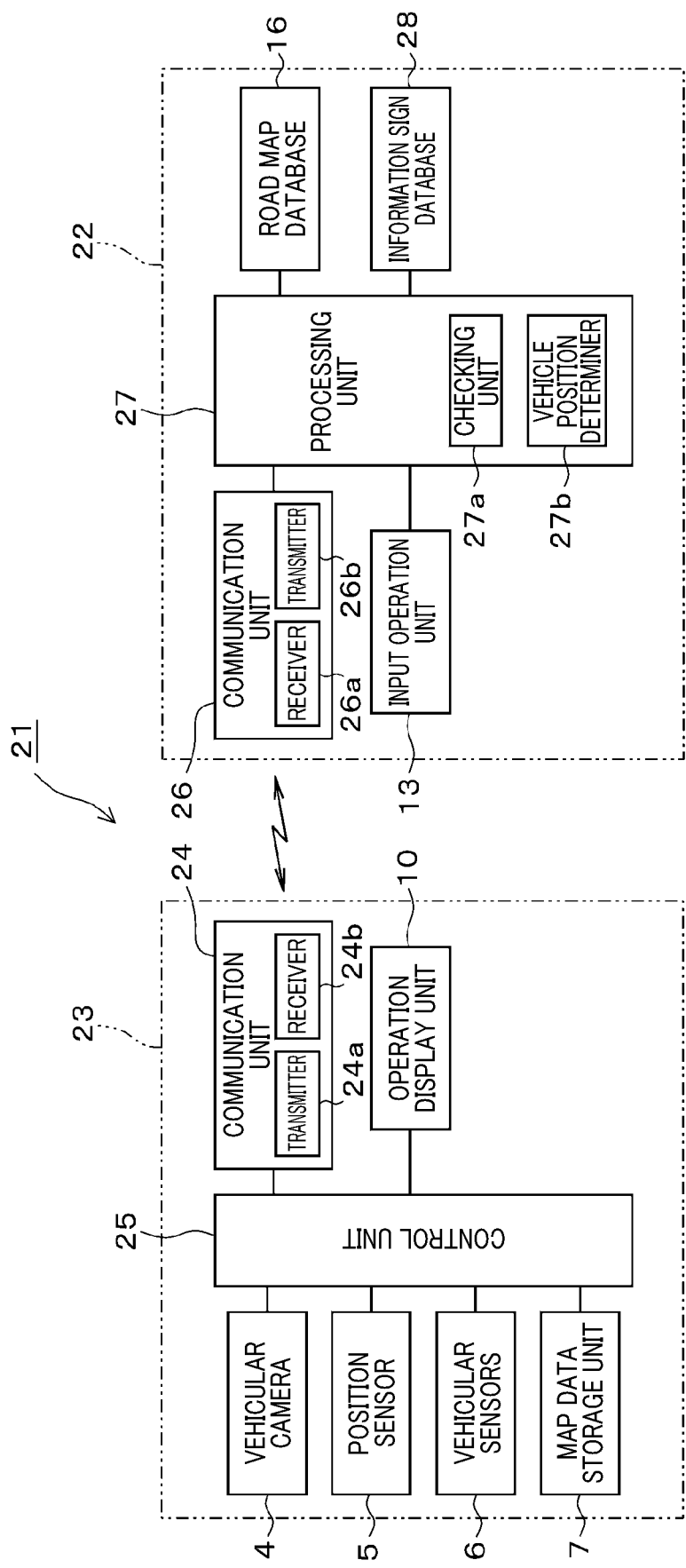
FIG. 6 is a block diagram schematically illustrating an overall configuration of a system according to the second embodiment.
Figure 7:
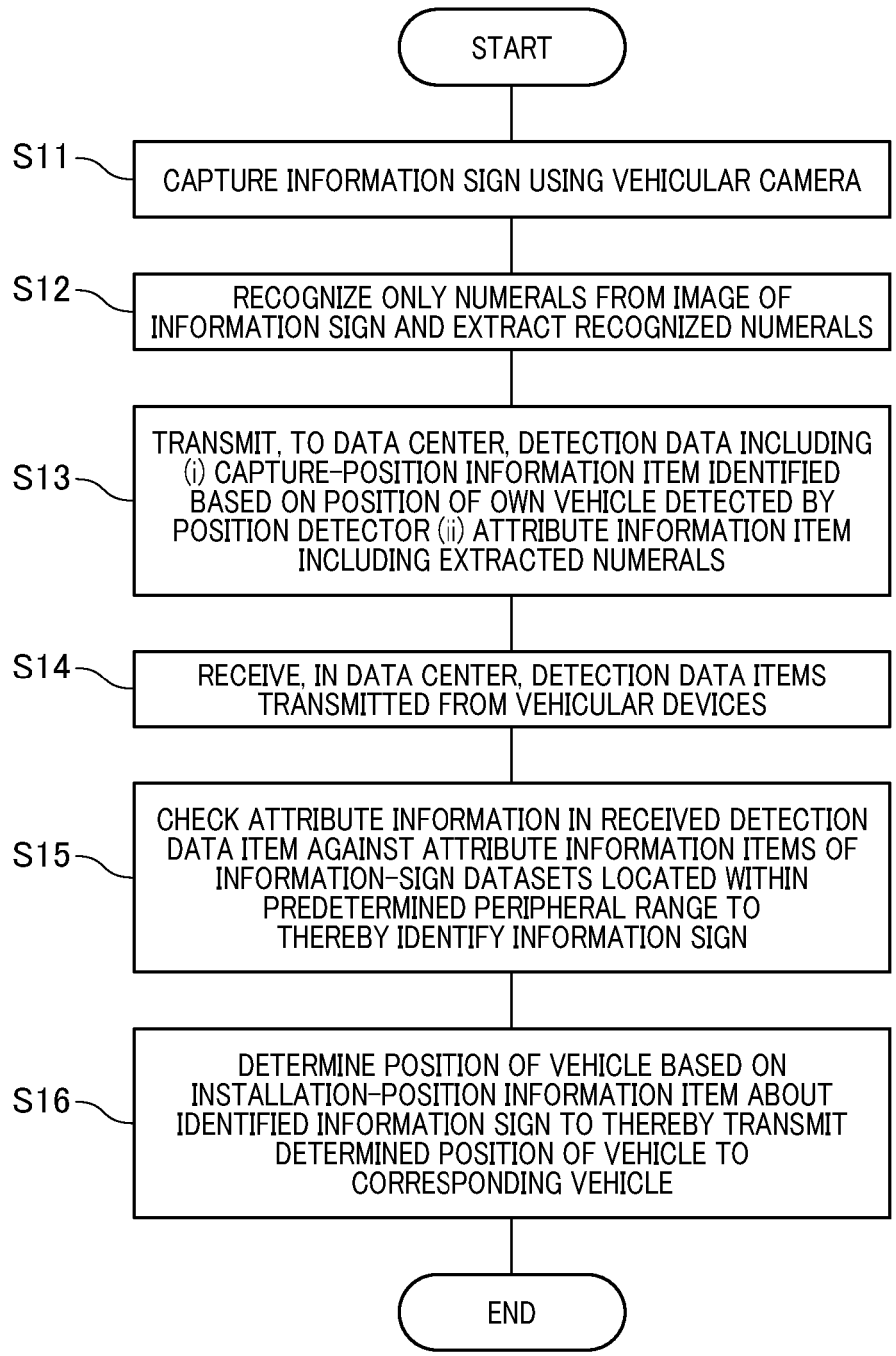
FIG. 7 is a flowchart schematically illustrating a procedure of an information-sign dataset checking routine carried out by a control unit and a processing unit according to the second embodiment.
Figure 8:
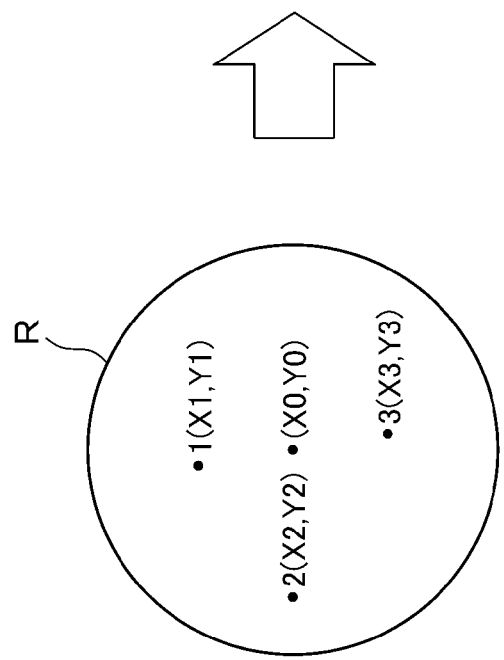
FIG. 8 is a diagram schematically illustrating how to perform checking according to the first embodiment.

The following describes the second embodiment with reference to FIGS. 6 to 8.

Referring to FIG. 6, an information sign recognition system 1 serving as a sign recognition system according to the second embodiment is comprised of a data center 22 and vehicular devices 23 installed in respective vehicles; the data center 22 and the vehicular systems 23 are communicably connectable with each other.

The vehicular device 23 installed in each vehicle includes the vehicular camera 4, the position detector 5, the various vehicular sensors 6, the map data storage unit 7, a communication unit 24, the operation display unit 10, and a control unit 25 serving as an extraction apparatus. The communication unit 24 serves as both a transmitter 24a as a transmitter unit, and a receiver 24b as a receiver unit.

The control unit 25 instructs the vehicular camera 4 to capture a forward road situation of the corresponding vehicle while the corresponding vehicle is traveling. Then, the control unit 25 determines whether there is at least one information sign as at least one sign in captured image data.

In response to determination that there is at least one information sign as at least one sign in the captured image data, the control unit 25 recognizes, from the captured image data of the at least one information sign, a string of characters that are included in the at least one information sign and belong to the at least one specified character type. Then, the control unit 25 extracts the recognized string of characters from the captured image data.

Thereafter, the control unit 25 determines the extracted string of characters as an attribute information item about the at least one information sign for identifying the at least one information sign. Then, the control unit 25 instructs the communication unit 24 to transmit, to the data center 22, the set of the capture-position information item and the attribute information item about the at least one information sign as a detection data item.

In addition, the communication unit 24 of the vehicular device 23 receives data indicative of the position of the corresponding vehicle transmitted from the communication unit 26 of the data center 22 as vehicle position data.

The data center 22 includes a communication unit 26, the input operation unit 13, a processing unit 27, the road map database 16, and an information sign database 28 serving as a sign database. The communication unit 26 receives the detection data items from each vehicular device 23. The communication unit 26 also transmits data indicative of each vehicle to the corresponding vehicular device as the vehicle position data. Thus, the communication device 26 serves as both a receiver 26a as a receiver unit and a transmitter 26b as a transmitter unit.

In the information sign database 28, the information sign datasets are stored; each of the information sign datasets is comprised of
(1) An installation position information item about a corresponding information sign as a sign
(2) An attribute information item about the corresponding information sign When receiving a detection data item from the vehicular device 3 of a target vehicle via the communication unit 26, the processing unit 27 checks the attribute information item of the received detection data item against the information-sign datasets stored in the information sign database 28 to thereby determine whether there is an information-sign dataset with the attribute information item that matches the attribute information item about the received detection data item.

In response to determination that there is an information-sign dataset with the attribute information item that matches the attribute information item about the received detection data item, the processing unit 27 determines the position of the target vehicle in accordance with (i) the installation position information item about the information-sign dataset, and (ii) a result of referring to the road map database 16.

This therefore enables the processing unit 27 to serve as both a checking unit 27a as a checking module and a vehicle position determination unit 27b as a vehicle position determination module.

For checking of the attribute information item about a target detection data item against the information-sign datasets stored in the information sign database 28, the processing unit 27 performs the following task.

Specifically, the processing unit 27 selects, from the information-sign datasets stored in the information sign database 28, some information-sign datasets whose capture-position information items are located within a predetermined range around the capture position indicted by the capture-position information item about the target detection data item. For example, the processing unit 27 selects, from the information-sign datasets stored in the information sign database 28, some information-sign datasets whose capture-position information items are located within a predetermined circular range with radius 100 meters around the capture position indicted by the capture-position information item about the target detection data item.

Then, the processing unit 27 searches the selected information-sign datasets for an information-sign dataset whose attribute information item matches the attribute information item about the target detection data item, thus checking the attribute information item about the target detection data item against the selected information-sign datasets.

Additionally, the processing unit 27 of the second embodiment instructs the communication unit 26 to transmit the determined position of the target vehicle to the vehicular device 23 of the target vehicle as the vehicle position data.

In response to receiving the vehicle position data, the vehicular device 23 of the target vehicle is capable of recognizing the position of the own target vehicle and/or updating the own target vehicle on navigation information.

FIG. 7 illustrates a flowchart representing a procedure of a vehicle position determination routine including capturing of an information sign carried out by the control unit 25 of each vehicular unit 23 and the processing unit 27 of the data center 22.

In FIG. 7, operations in respective steps S11 to S13 are carried out by the control unit 25 of each vehicular device 23 while the corresponding vehicle is traveling.

Like the first embodiment, the control unit 25 causes the vehicular camera 4 to capture an image of an information sign in step S11. Next, the control unit 25 performs a step of
1. Recognizing, from captured image data about the information sign, numerals as the at least one specified character type
2. Extracting the recognized numerals from the captured image data to thereby obtain an attribute information item in step S12

Then, the control unit 25 instructs the communication unit 24 to transmit, to the data center 22, the set of a capture-position information item and the attribute information item about the information sign as a detection data item in step S13.

Operations in respective steps S14 to S16 are carried out by the processing unit 27 of the data center 22.

Specifically, the processing unit 27 of the data center 22 receives, via the communication unit 26 of the data center 22, the detection data items transmitted from each vehicular device 23 in step S14.

Next, the processing unit 27 checks the attribute information item about each received each detection data item against the attribute information items of the respective information-sign datasets stored in the information sign database 28 to thereby identify an information-sign dataset for each received detection data item; the at information-sign dataset for the corresponding received detection data item has the attribute information item that matches the attribute information item about the corresponding received detection data item in step S15.

Subsequently, the processing unit 27 determines, based on the installation position information item about the information-sign dataset identified for each received detection data item, the position of the vehicle identified for the corresponding received detection data item in step S16. Then, the processing unit 27 transmits, as the vehicle position data, the position of each vehicle determined based on the corresponding information-sign dataset to the corresponding vehicle in step S16. Thereafter, the processing unit 27 terminates the vehicle position determination routine.

FIG. 8 illustrates an example representing how the processing unit 27 performs the checking operation. FIG. 8 illustrates an example situation where the capture-position information item included in a target detection data item has, for example, coordinates (X0, Y0), and the attribute information item included in the target detection data item is "155261".

In this situation, the processing unit 27 draws a circular range R with radius 100 meters around the capture-position information item (X0, Y0), and extracts, from the information sign database 28, one or more information-sign datasets located within the circular range R. In this example, the processing unit 27 extracts, from the information sign database 28, three information-sign datasets respectively assigned with identification Nos. 1, 2, and 3 located within the circular range R.

Then, the processing unit 27 deter mines whether the attribute information item about the target detection data item matches that about each of the three information-sign datasets respectively assigned with the identification Nos. 1, 2, and 3. In response to determination that the attribute information item about the target detection data item matches that about one of the three information-sign datasets respectively assigned with the identification Nos. 1, 2, and 3, the processing unit 27 identifies that the captured information sign corresponds to an information sign linked to the one of the three information-sign datasets.

For example, in FIG. 8, because the attribute information item "155261" about the target detection data item matches the attribute information item "155261" about the information-sign dataset assigned with the identification No. 1, the processing unit 27 identifies that the captured information sign corresponds to an information sign linked to the information-sign dataset assigned with the identification No. 1.

Otherwise, in response to determination that the attribute information item about the target detection data item does not match that about any of the extracted information-sign datasets or matches two or more of the extracted information-sign datasets, the processing unit 27 determines a failure of identification of the target detection data item.

As described above, the information sign recognition system 1 according to the second embodiment is configured such that a detection data item is transmitted from a target vehicular device 23 to the data center 22, and the processing unit 27 of the data center 22 receives the detection data item, and checks the attribute information item included in the received detection data item against the attribute information items about the respective information-sign datasets stored in the information sign database 28. This enables one of the information-sign datasets, which corresponds to the received detection data item to be identified, making it possible to identify the position of the vehicle corresponding to the target vehicular device 23.

Additionally, the processing unit 27 is capable of transmitting information about the identified position of the vehicle to the corresponding target vehicular device 23, making it possible for the target vehicular device 23 to recognize a more accurate position of the corresponding own vehicle.

The attribute information about each information sign for identifying the corresponding information sign in the information sign recognition system 1 according to the second embodiment is comprised of the string of characters, such as numerals, which belong to the at least one specified character type, extracted from the corresponding information sign. This therefore lowers the amount of data transmitted from each vehicular device 23 to the data center 22.

This therefore results in

1. Shorter time of communications between the data center 22 and each vehicular device 23
2. Shorter time required to manipulate the detection data items
3. Simpler execution of the checking operation by the processing unit 27 with shorter time because of the lowered amount of data transmitted from each vehicular device 23 to the data center 22

Additionally, the processing unit 27 is configured to search information-sign datasets, which are located within a predetermined range around the captured-position information item about a target detection data item, for an information-sign dataset whose attribute information item matches the attribute information item about the target detection data item. This configuration therefore makes it possible to more easily check a captured information sign with the information-sign datasets stored in the information sign database 28 with sufficient accuracy.

Third Embodiment

Figure 9:
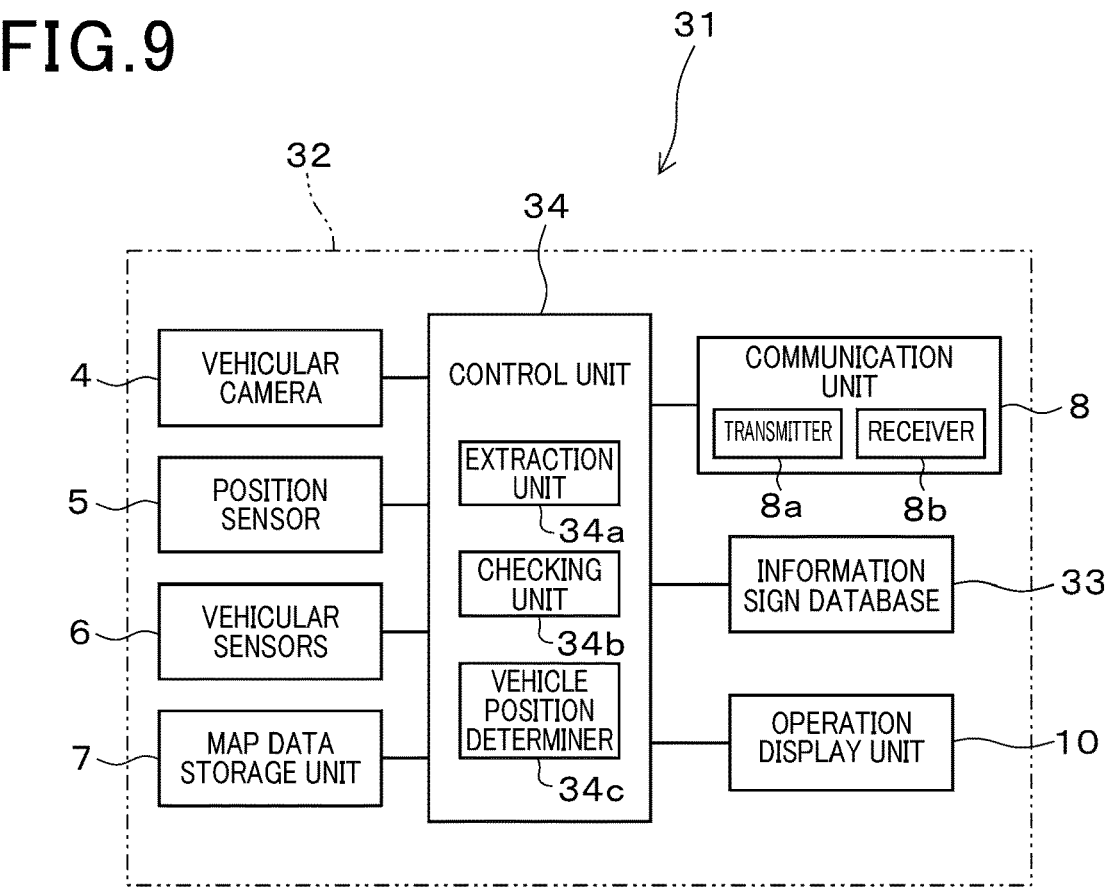
FIG. 9 is a block diagram schematically illustrating an overall configuration of a system according to the third embodiment.
Figure 10:
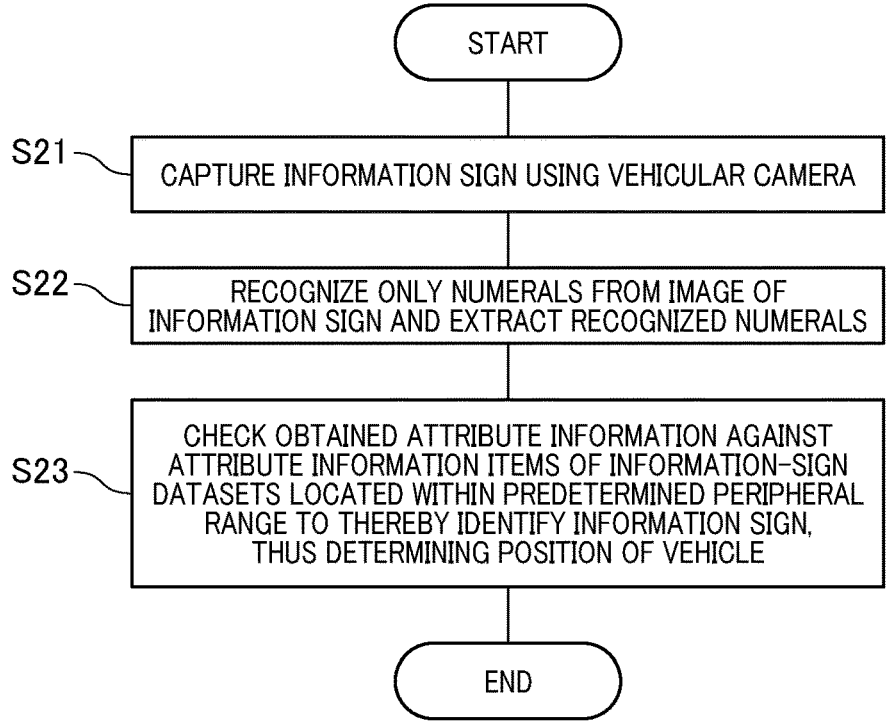
FIG. 10 is a flowchart schematically illustrating a procedure of an information-sign dataset checking routine carried out by a control unit according to the third embodiment.

The following describes the third embodiment with reference to FIGS. 9 and 10.

Referring to FIG. 9, an information sign recognition system 31 serving as a sign recognition system according to the third embodiment is comprised of a vehicular device 32 installed in a vehicle.

The vehicular device 32 installed in the vehicle includes the vehicular camera 4, the position detector 5, the various vehicular sensors 6, the map data storage unit 7, an information sign database 33 serving as a sign database, the operation display unit 10, and a control unit 34.

In the information sign database 33, the information sign datasets are stored, each of which serves as a new high-accuracy sign dataset. Each of the information-sign datasets for example is generated by, for example, the data center 2 described in the first embodiment to have a high accuracy, and the information-sign datasets are transmitted from the data center 2 to each vehicular device 31.

The control unit 34 instructs the vehicular camera 4 to capture a forward road situation of the corresponding vehicle while the corresponding vehicle is traveling. Then, the control unit 25 determines whether there is an information sign as a sign in captured image data.

In response to determination that there is an information sign as a sign in the captured image data, the control unit 34 recognizes, from the captured image data of the information sign, a string of characters that are included in the information sign and belong to the at least one specified character type. Then, the control unit 34 extracts the recognized string of characters from the captured image data.

Thereafter, the control unit 34 determines the extracted string of characters as an attribute information item about the information sign for identifying the information sign, and generates the set of a capture-position information item and the attribute information item about the information sign as a detection data item.

Additionally, the control unit 34 checks the attribute information item about the generated detection data item against the information-sign datasets stored in the information sign database 33 to thereby determine whether there is an information-sign dataset with the attribute information item that matches the attribute information item about the generated detection data item.

In response to determination that there is an information-sign dataset with the attribute information item that matches the attribute information item about the generated detection data item, the control unit 34 performs localization of the corresponding own vehicle in accordance with the installation position information item about the information-sign dataset to accordingly determine the position of the corresponding own vehicle.

This therefore enables the control unit 34 to serve as an extraction unit 34a as an extraction module, a checking unit 34b as a checking module, and a vehicle position determination unit 34c as a vehicle position determination module.

FIG. 10 illustrates a flowchart representing a procedure of a vehicle position determination routine including capturing of an information sign carried out by the control unit 34 of each vehicular unit 32.

Specifically, the control unit 34 causes the vehicular camera 4 to capture an image of an information sign as a sign in step S21. Next, the control unit 34 performs a step of 1. Recognizing, from captured image data about the information sign, numerals as the at least one specified character type
2. Extracting the recognized numerals from the captured image data to thereby obtain an attribute information item in step S21

Then, the control unit 34 generates the set of a capture-position information item and the attribute information item about the information sign as a detection data item in step S21.

Next, the control unit 34 checks the attribute information item about the generated detection data item against the attribute information items of the respective information-sign datasets stored in the information sign database 33 to thereby identify an information-sign dataset for the generated detection data item; the information-sign dataset for the generated detection data item has the attribute information item that matches the attribute information item about the generated detection data item in step S23.

In step S23, the control unit 34 determines the position of the corresponding own vehicle in accordance with the installation position information item about the information-sign dataset identified for the generated detection data item, and thereafter terminates the vehicle position determination routine.

The control unit 34 of the third embodiment can perform the checking operation, which is identical to the checking operation performed by the processing unit 27 of the second embodiment.

Specifically, the control unit 34 extracts, from the information sign database 28, information-sign datasets located within a circular range with radius 100 meters around the capture-position information item about the generated detection data item.

Then, the control unit 34 determines whether the attribute information item about the generated detection data item matches that about each of the extracted information-sign datasets. In response to determination that the attribute information item about the generated detection data item matches that about one of the extracted information-sign datasets, the control unit 34 identifies that the captured information sign corresponds to an information sign linked to the one of the extracted information-sign datasets.

The vehicular device 32 according to the third embodiment causes the vehicular camera 4 to capture an information sign for road guidance as a sign while the corresponding own vehicle is traveling, and extracts, from captured image data of the information sign, numerals as the at least one specified character type to thereby obtain an attribute information item about the information sign.

Then, the vehicular device 32 generates the set of a capture-position information item and the attribute information item about the information sign as a detection data item. Next, the vehicular device 32 checks the attribute information item about the generated detection data item against the attribute information items of the respective information-sign datasets stored in the information sign database 33 to thereby identify an information-sign dataset for the generated detection data item; the information-sign dataset for the generated detection data item has the attribute information item that matches the attribute information item about the generated detection data item.

The vehicular device 32 localizes the corresponding own vehicle in accordance with the installation position information item about the information-sign dataset identified for the generated detection data item.

That is, the information sign recognition system 31 of the third embodiment enables only the vehicular device 32 to perform localization of the corresponding own vehicle to thereby obtain the position of the corresponding own vehicle with higher accuracy without communications with the data center 2. This therefore enables the vehicular device 32 to localize the corresponding own vehicle with higher accuracy without confusion of the signs even under a situation where similar signs, such as similar information signs or similar signboards appear successively while, for example, the corresponding own vehicle is traveling on an expressway or a general road in an urban area.

The attribute information about each information sign for identifying the corresponding information sign in the information sign recognition system 31 according to the third embodiment is comprised of the string of characters, such as numerals, which belong to the at least one specified character type, extracted from the corresponding information sign. This therefore extremely lowers the amount of data to be checked by the vehicular device 32, resulting in simpler execution of the checking operation with shorter time. This also enables the amount of the information-sign datasets stored in the information sign database 33 to be smaller, making it possible to obtain the position of the corresponding own vehicle with higher accuracy while maintaining small the storage capacity of the information-sign datasets.

Note that a vehicular device installable in a vehicle can include a function of collecting probe data items, each of which includes information about a current position of the vehicle and information about an image captured by a camera while the vehicle is traveling. The probe data items collected by each of the vehicular devices are transmitted to a center of a map data generation system, so that the center collects a lot of the probe data items. Then, the center integrates the probe data items with one another to thereby generate high-accuracy map data while updating it, which can be applied for autonomous driving.

In this example, it is possible to use position data items about signs, such as information signs as landmarks, to thereby perform alignment of each probe data with the map data and/or alignment of the probe data items with one another. This makes it possible to perform high-accuracy alignment of landmarks with one another to thereby generate high-accuracy map data.

Fourth Embodiment

Figure 11:
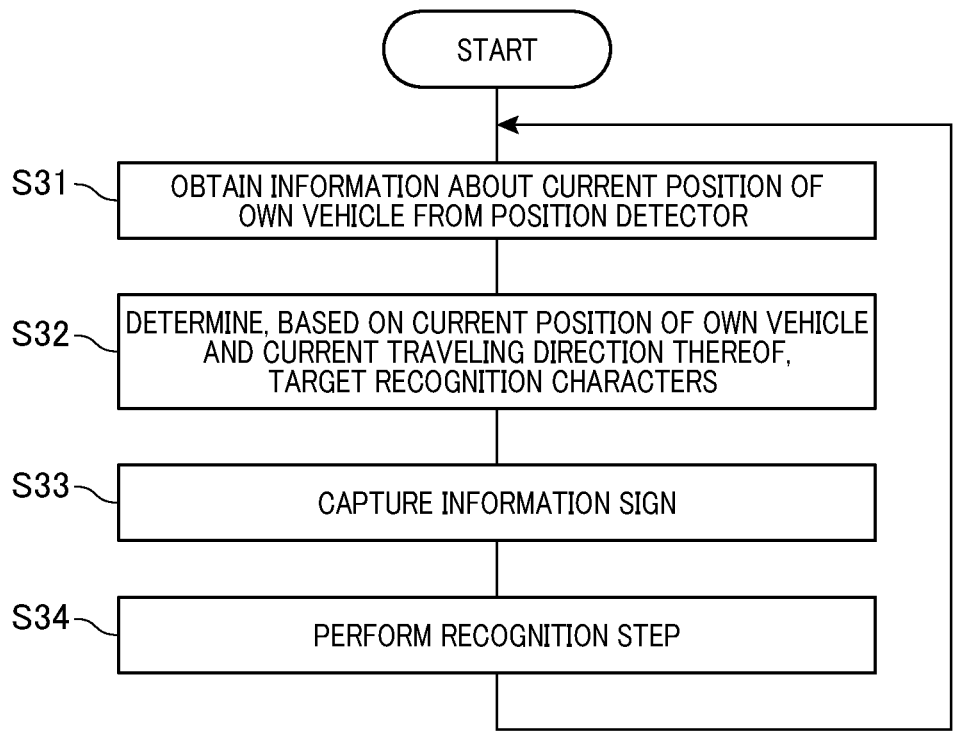
FIG. 11 is a flowchart schematically illustrating a procedure of an information-sign dataset checking routine carried out by a control unit according to the fourth embodiment.

The following describes the fourth embodiment with reference to FIG. 11. The following describes features of the fourth embodiment, which is different from those of the third embodiment.

Like the third embodiment, a vehicular device installed in a vehicle includes the vehicular camera, the position detector, the various vehicular sensors, the map data storage unit, the information sign database serving as a sign database, the operation display unit, and the control unit.

The control unit of the fourth embodiment serves as the extraction module, the checking module, and the vehicle position determination module. That is, the control unit is configured to extract, from captured image data of an information sign as a sign captured by the vehicular camera, the at least one specified character type to thereby obtain an attribute information item about the information sign.

The fourth embodiment utilizes kanji characters (Chinese characters) in addition to numerals as the specified types of characters in addition to numerals (numeric characters).

The fourth embodiment is configured such that the number of kanji characters in the specified types of characters to be recognized by the control unit is determined to a predetermined limited number. In addition, the control unit is configured to dynamically change recognition target characters included in at least one of the specified types of characters in accordance with the position of the corresponding own vehicle detected by the position detector.

For example, signs located in respective intersections include information signs, each of which shows the name of the corresponding intersection, the name of the corresponding traffic spot, or the name of the corresponding facility. Such information signs include many information signs in each of which the name of a corresponding intersection is written by kanji characters, such as "刈 (kari)", "谷 (ya)", and "駅 (eki)", or "刈 (kari)", "谷 (ya)", "駅 (eki)", and "西 (nishi)".

It is unfortunately difficult to recognize all kanji characters.

From this viewpoint, the control unit of the fourth embodiment determines, based on the current position and the current traveling direction of the corresponding own vehicle, limited kanji characters as the recognition target characters; the limited kanji characters are predicted to be used by an information sign. For example, the number of the limited kanji characters is preferably set to a value selected from the range of approximately ten characters to a few dozen characters.

FIG. 11 illustrates a flowchart representing a procedure of a character recognition routine carried out by the control unit of each vehicular unit installed in the corresponding own vehicle.

Specifically, the control unit obtains an approximate current position of the corresponding own vehicle based on information measured by the position detector in step S31.

Next, the control unit determines, based on the current position and current traveling direction of the corresponding own vehicle, recognition target characters in step S32. In the above example, the control unit determines limited kanji characters of "刈 (kari)", "谷 (ya)", "駅 (eki)", and "

西 (nishi)" as the recognition target characters, and adds the limited kanji characters to a prepared recognition dictionary. The recognition target characters can be configured to be transmitted to the control unit of each vehicular device from the data center or the control unit of each vehicular device can extract the recognition target characters from all characters recognizable thereby.

Subsequently, the control unit causes the vehicular camera to capture an image of an information sign as a sign to thereby obtain captured image data of the information sign in step S33.

Following the operation in step S33, the control unit performs, as a recognition step, a step of
1. Recognizing, from the captured image data of the information sign, numerals and kanji characters belonging to the recognition target characters
2. Extracting the recognized numerals and kanji characters from the captured image data of the information sign in step S34

When recognizing kanji characters, the control unit makes it possible to easily perform the recognition step in a shorter time, because the number of kanji characters to be recognized by the control unit is set to a smaller number of characters determined by the limited number of kanji characters.

After the corresponding own vehicle passes a location where the captured information sign is installed, the control unit repeats the character recognition routine from step S31 for the next upcoming information sign.

Like the first to third embodiments, the fourth embodiment achieves a benefit of more simply performing a task of identifying that the information sign captured by the vehicular camera 5 as a sign matches which of information signs stored in the information-sign database. In particular, the fourth embodiment utilizes kanji characters as the specified types of characters to be recognized in addition to numerals, making it possible to expand the applicability of the information sign recognition system of the fourth embodiment.

Although the fourth embodiment describes an embodied configuration that dynamically changes recognition target kanji-characters in accordance with the position of the corresponding own vehicle, but the present disclosure is not limited to this embodied configuration.

Specifically, plural types of characters can be determined as the recognition target characters in accordance with the position of the vehicle. For example, hiragana characters, katakana characters, and kanji characters can be determined as the recognition target characters to be recognized by the control unit. The control unit of each vehicle can dynamically change one or more types of characters determined as the recognition target characters in accordance with the position of the corresponding vehicle.

For example, the control unit of each vehicle can be configured to dynamically set
1. Numerals (numeric characters) as the recognition target characters in response to determination that the corresponding vehicle is traveling on a limited highway, such as an expressway
2. Numerals and alphabets (alphabet characters) as the recognition target characters in response determination that the corresponding vehicle is traveling on a general road
Limiting, from all types of characters, one or several types of characters to be determined as the recognition target characters enables the processing road of the CPU of the control unit to be reduced, which is similar to each of the first to thirds embodiment.

Fifth and Sixth Embodiments and Other Embodiments

Figure 12:
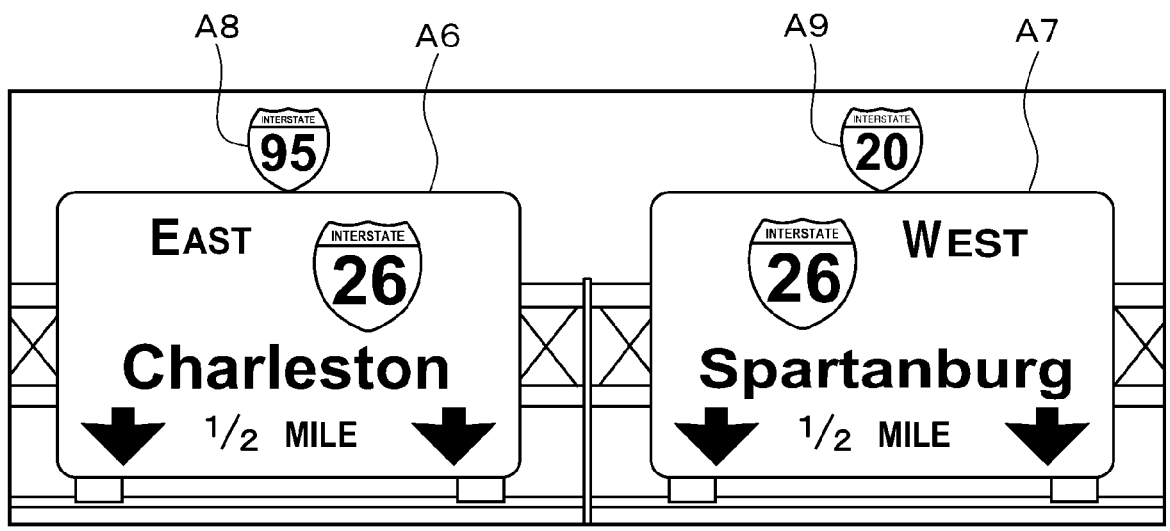
FIG. 12 is a view illustrating a specific example of an information sign according to the fifth embodiment.

FIG. 12 schematically illustrates an example of information signs and signboards according to the fifth embodiment. As illustrated in FIG. 5, information signs A6 and A7 are juxtaposed to each other as left and right signs. The information signs A6 and A7 are very similar to each other, so that, for recognition of numerals in each of the information signs A6 and A7, the numerals "26½" are recognized to be extracted. That is, a result of the recognition of the information sign A6 is identical to a result of recognition of the information sign A7.

In addition, in this example, at the upper side of the information sign A6, a signboard A8 in which numerals "95" are written is located, and at the upper side of the information sign A7, a signboard A9 in which numerals "20" are written is located. Inherently, the information sign A6 and the signboard A8 are processed as individually separated signs, and similarly, the information sign A7 and the signboard A9 are processed as individually separated signs.

The information sign A6 and the signboard A8 can however be processed as an integrated sign, and similarly the information sign A7 and the signboard A9 can however be processed as an integrated sign.

This enables the string of characters, i.e. the string of "95 26½", extracted as an attribute information item from the integrated sign of A6 and A8 to be easily distinguished from the string of characters, i.e. the string of "20 26½", extracted as an attribute information item from the integrated sign of A7 and A9.

That is, two information signs, two signboards, or a pair of an information sign and a signboard, which are arranged in a vertical direction corresponding to a Z-axis direction, can be processed as an integrated sign. This achieves a benefit of more easily distinguishing the attribute information item of the integrated sign from another sign. It is also possible to add priority information to each of the string of numerals "95" and the string of numerals "20"; the string of numerals with the priority information being added thereto has a higher priority than another string of numerals with no priority information.

FIG. 13 schematically illustrates the sixth embodiment. The sixth embodiment is configured to
1. Extract, from captured image data of the information sign A2 as a sign, a first set of numerals "155", a second set of numerals "26", and a third set of a numeral "1", each of which belongs to a at least one specified character type
2. Add coordinate information about the position of each of the first to third sets to an assignment information item of the information sign The coordinate information about each of the first to third sets is comprised of (X,Y); X represents a coordinate of the corresponding one of the first to third sets in the horizontal direction corresponding to an X direction, and Y represents a coordinate of the corresponding one of the first to third sets in the vertical direction corresponding to a Y direction.

This enables plural signs which have similar characters in a specified type to be likely to be distinguished from each other, making it possible to more accurately recognize information signs in a shorter time.

The sixth embodiment can be modified to

1. Add rough positional information about a position of a first set of numerals, such as an upper left position, to an assignment information item of the information sign
2. Add rough positional information about the position of a second set of numerals, such as a center position, to the assignment information item of the information sign
3. Add rough positional information about the position of a third set of numerals, such as a right end position, to the assignment information item of the information sign For determination of an assignment information item about a single sign using a string of plural characters, it is possible to determine, as the assignment information about the single sign, (i) all the characters, or (ii) a selected character with the largest size in all the characters.

If a single sign includes plural sets of characters, it is possible to individually extract a string of the plural sets of characters with a separator, such as a comma, a colon, or a slash, between each adjacent pair of the plural sets.

The attribute information about each information sign can include numerals and characters of a unit attached thereto, such as a kanji character of "分 (fun)", alphabetic characters of "min", "km", or "m", which belong to the at least one specified character type. The position information about characters included in each sign can be plotted on the corresponding sign on the map data. The position information about each sign can be efficiently used to perform localization of a corresponding vehicle. Similarly, information about the font size of characters included in each sign can be plotted on the corresponding sign on the map data. The font size information about each sign can also be efficiently used to perform localization of a corresponding vehicle.

As at least one specified character type in each embodiment, numeric characters and/or kanji characters are utilized, but capital alphabetic characters, lowercase alphabetic characters, hiragana characters, or katakana characters can be utilized as at least one specified character type. Systematically classified plural types of characters, such as kanji characters and numerals or capital alphabetic characters and numerals, can also be utilized as at least one specified character type.

A combination of particular numerals, such as 1, 2, 3, 4, 5, 6, 7, 8, and 9, selected from all numerals and particular alphabetic characters, such as A, B, C, D, E, F, G, H, I, J, K, L, M, and N, can be used as at least one specified character type. At least one type of characters for recognition of signs can be changed depending on types of the signs and/or their landmarks. For example, numerals can be used as the at least one type of characters if a sign is a direction signboard. If a sign is a signboard of a large-scale commercial facility, characters of the name of the large-scale commercial facility written in the signboard can be used as the at least one type of characters. Additionally, if a sign is a signboard indicative of the name of a corresponding intersection, a combination of numerals and kanji characters, or numerals and alphabetic characters can be used as the at least one type of characters.

Each embodiment is implemented for recognition of information signs installed mainly for an expressway, but can be implemented for recognition of information signs installed for a general road.

The processing unit 27 according to the second embodiment can be programmed to determine, based on the installation position information item about the information-sign dataset identified for each received detection data item, the position of the vehicle identified for the corresponding received detection data item in step S15, and thereafter, terminate the vehicle position determination routine without executing the operation in step S16.

Each embodiment is implemented for recognition of information signs as an example of signs, but each embodiment can be implemented for recognition of signboards as an example of signs. In this modification, signboards can include 1. A signboard in which the name of a large-scale shopping center and the distance to the large-scale shopping center are written
2. A signboard in which the name of a building is written
3. A signboard in which the name of a facility is written
4. A signboard in which the name and/or the logo of a shop, such as a gas station, a restaurant, or a fast-food restaurant with a drive-through That is, each embodiment can be implemented for recognition of signboards that are installed for mainly commercial purpose.

The hardware configuration and/or the software configuration of each of the vehicular devices, the vehicles, and the data centers can be freely modified. The present disclosure has been described based on the above embodiments, but the present disclosure is understood not to be limited to the embodiments and the above configurations. The present disclosure can include various modifications within the scope of their equivalents. Various combinations or embodiments to which one or more components will be added or from which one or more components will be eliminated are included within the scope of the present disclosure or within the inventive concept of the present disclosure.

The control units and methods described in the present disclosure can be implemented by a dedicated computer including a memory and a processor programmed to perform one or more functions embodied by one or more computer programs.

The control units and methods described in the present disclosure can also be implemented by a dedicated computer including a processor comprised of one or more dedicated hardware logic circuits.

The control units and methods described in the present disclosure can further be implemented by a processor system comprised of a memory, a processor programmed to perform one or more functions embodied by one or more computer programs, and one or more hardware logic circuits.

The one or more programs can be stored in a non-transitory storage medium as instructions to be carried out by a computer or a processor.

What is claimed is:

1. A system for recognizing a sign in accordance with image data of the sign captured by a vehicular camera installed in a vehicle, the system comprising:
    an extraction unit configured to:
        extract, from a plurality of specified character types that are described in the sign and systematically classified, characters that belong to at least one specified character type included in the plurality of specified character types; and
        combine the extracted characters of the at least one specified character type with each other to accordingly generate a string of the extracted characters; and
    a sign database configured to store a sign dataset including:
        an installation-position information item indicative of an installation position of the sign; and an attribute information item about the sign, the attribute information item about the sign including the string of the extracted characters extracted by the extraction unit.

2. The system according to claim 1, wherein:
the vehicle comprises a plurality of vehicles; and
the system further comprises a plurality of vehicular devices respectively installed in the plurality of vehicles; and
a data center communicably connectable with the plurality of vehicular devices,
each of the plurality of vehicular devices in a corresponding one of the plurality of vehicles comprising:
the vehicular camera;
the extraction unit, the extraction unit being configured to:
recognize, in the image data captured by the vehicular camera while the corresponding one of the plurality of vehicles is traveling, the one or more characters that are included in the sign and belong to the at least one specified character type; and
extract, from the image data, the recognized one or more characters; and
a transmitter unit configured to transmit, to the data center, a detection data item including the installation-position information item about the sign and the attribute information item extracted by the extraction unit, the data center comprises:
the sign database; and
a collector configured to collect the detection data items transmitted from the respective vehicular devices; and
a register configured to register, as the sign dataset, a plurality of sign datasets based on the detection data items collected by the collector.

3. The system according to claim 2, wherein:
the register is configured to:
select, from the received detection data items, plural detection data items that have the same attribute information item;
perform statistical processing of capture-position information items respectively included in the selected detection data items to thereby determine the installation-position information item for each of the selected detection data items; and
set the corresponding installation-position information item included in the sign dataset to the determined installation-position information item for each of the selected detection data items.

4. The system according to claim 1, wherein:
the vehicle comprises a plurality of vehicles; and
the system further comprises a plurality of vehicular devices respectively installed in the plurality of vehicles; and
a data center communicably connectable with the plurality of vehicular devices,
each of the plurality of vehicular devices in a corresponding one of the plurality of vehicles comprising:
the vehicular camera;
the extraction unit, the extraction unit being configured to:
recognize, in a new sign of new image data captured by the vehicular camera while the corresponding one of the plurality of vehicles is traveling, the one or more characters that are included in the new sign and belong to the at least one specified character type; and
extract, from the new image data, the recognized one or more characters; and
a transmitter unit configured to transmit, to the data center, a detection data item of the new sign, the detection data item of the new sign including the installation-position information item about the new sign and the attribute information item extracted by the extraction unit,
the data center comprises:
the sign database in which a plurality of the sign datasets are stored;
a receiver configured to receive the detection data item transmitted from one of the plurality of vehicular devices; and
a checking unit configured to check the attribute information item included in the detection data item of the new sign against the sign datasets stored in the sign database; and
a vehicle position determination unit configured to:
determine whether there is the attribute information item of a selected one of the sign datasets included in the sign database, the attribute information item of the selected one of the sign datasets matching the attribute information item included in the detection data item of the new sign; and
determine a position of the vehicle of the one of the plurality of vehicular devices in accordance with the attribute information item about the selected one of the sign datasets.

5. The system according to claim 1, wherein:
the system further comprises a vehicular device that comprises:
the vehicular camera;
the extraction unit, the extraction unit being configured to:
recognize, in a new sign of new image data captured by the vehicular camera while the vehicle is traveling, the one or more characters that are included in the sign and belong to the at least one specified character type; and
extract, from the new image data, the recognized one or more characters to thereby generate a detection data item including the installation-position information item about the new sign and the attribute information item extracted by the extraction unit;
the sign database in which a plurality of the sign datasets are stored;
a checking unit configured to check the attribute information item included in the detection data item of the new sign against the sign datasets stored in the sign database; and
a vehicle position determination unit configured to:
determine whether there is the attribute information item of a selected one of the sign datasets included in the sign database, the attribute information item of the selected one of the sign datasets matching the attribute information item included in the detection data item of the new sign; and
determine a position of the vehicle in accordance with the attribute information item of the selected one of the sign datasets.

6. The system according to claim 4, wherein:
the checking unit is configured to:
extract, from the sign database, plural sign datasets that are located within a predetermined range around capture-position information of the detection data item of the new sign; and search the extracted sign datasets for determination of one of the extracted sign datasets, the attribute information item about one of the extracted sign datasets matching the attribute information item about the detection data item of the new sign.

7. The system according to claim 1, wherein:
the at least one specified character type includes numerals.

8. The system according to claim 7, wherein:
the extraction unit is configured to:
    perform a search of the image data of the sign for numerals from left to right of the image data;
    repeat the search from top to bottom of the image data of the sign to extract numerals from the image data of the sign; and
    arrange the extracted numerals in an order of extracting, thus obtaining a string of the arranged numerals as the attribute information item about the sign.

9. The system according to claim 1, wherein:
the extracted characters are dynamically changed in accordance with a position of the vehicle.

10. The system according to claim 9, wherein:
the at least one specified character type includes kanji characters; and
a number of the extracted characters is limited to a predetermined number, and the predetermined number of characters to be recognized by the extraction unit is dynamically changed in accordance with the position of the vehicle.

11. The system according to claim 1, wherein:
the plurality of specified character types are a first type of numerals and a second type of alphabetic characters; and
the extraction unit is configured to perform: any one of:
    a first task of extracting plural numerals from the first type of numerals that are described in the sign as the extracted characters;
    a second task of extracting plural alphabetic characters from the second type of alphabetic characters that are described in the sign as the extracted characters as the extracted characters; and
    a third task of extracting at least one numeral from the first type of numerals and at least one alphabetic character from the second type of alphabetic characters as the extracted characters.

12. A method of recognizing a sign in accordance with image data of the sign captured by a vehicular camera installed in a vehicle, the method comprising:
    extracting, from a plurality of specified character types that are described in the sign and systematically classified, characters that belong to at least one specified character type included in the plurality of specified character types; and
    combining the extracted characters of the at least one specified character type with each other to accordingly generate a string of the extracted characters; and
    storing a sign dataset including:
        an installation-position information item indicative of an installation position of the sign; and
        an attribute information item about the sign, the attribute information item about the sign including the string of the extracted characters extracted by the extracting.

* * * * *